United States Patent [19]

Michel

[11] 3,917,544

[45] Nov. 4, 1975

[54] AGGLOMERATED ADSORBENT PRODUCTS OF MOLECULAR SIEVE GRAINS

[75] Inventor: Max Michel, Sarcelles-des-Rosiers, France

[73] Assignee: Rhone-Progil, Courbevoie, France

[22] Filed: Oct. 4, 1973

[21] Appl. No.: 403,668

Related U.S. Application Data

[63] Continuation-in-part of Ser. No. 274,481, July 24, 1972, which is a continuation of Ser. No. 560,059, June 24, 1966, abandoned.

[30] Foreign Application Priority Data

June 29, 1965 France .............................. 65.22737

[52] U.S. Cl. ............................ 252/455 Z; 23/143

[51] Int. Cl.² .......................................... B01J 29/06
[58] Field of Search ................................ 252/455 Z

[56] References Cited
UNITED STATES PATENTS

| 2,881,050 | 4/1959 | Pingard .............................. 23/143 |
| 2,915,365 | 12/1959 | Saussol ............................... 23/142 |
| 3,210,267 | 10/1965 | Plank et al. ...................... 252/455 Z |

Primary Examiner—Carl F. Dees

[57] ABSTRACT

An adsorbent agglomerate of molecular sieve grains bonded with an inorganic binder in admixture with the grains and prepared by mixing the molecular sieve grains with partially dehydrated aluminum trihydrate and exposing the composition to moisture to harden the alumina after agglomeration to the desired shape.

2 Claims, No Drawings

AGGLOMERATED ADSORBENT PRODUCTS OF MOLECULAR SIEVE GRAINS

This is a continuation-in-part of copending application Ser. No. 274,481, filed on July 24, 1972, which in turn is a continuation of application Ser. No. 560,059, filed on June 24, 1966, now abandoned.

This invention relates to adsorbent agglomerates, such as pellets, extruded products, granules and fragments of various shapes, and it relates more particularly to such agglomerates formed of molecular sieve grains.

Considerable interest has developed in the use of molecular sieves in adsorption and in catalytic processes. Such interests arise from the peculiar properties of such materials, due to their regular crystalline structure in which the pores are in the order of a few angstroms and of such uniform size as to limit passage to molecules of smaller size thereby to provide a means for molecular classification.

Such molecular sieves usually make use of pure crystals which are so small as to make it difficult to make use of them on an industrial scale. As a result, usage has been limited to agglomerates formed of such materials with binders such as alumina gel or clay. These binders are poor adsorbents, and, when used in substantial proportions, they reduce the properties of the molecular sieve without compensation by other properties.

It would be of considerable commercial value to produce a molecular sieve which makes use of grains of the type described formed into agglomerates of larger dimension with a binder component which, by itself, has good adsorption characteristics and which can be employed in various proportions. This has been difficult to achieve if the products to be agglomerated do not exceed 1 micron in size of the elementary crystals obtained in accordance with present practice.

In French application No. 14,834, filed Apr. 27, 1965, and entitled "Synthetic zeolites agglomerates," description is made of a process for producing molecular sieves of grains having a grain size greater than 1 micron and usually within the range of 30 to 100 $\mu$, but which may even reach a millimeter in size. Such materials have found considerable interest alone in various processes, particularly in processes based upon fluidization.

I have now found that there is great commercial interest in adsorbent products when in the form of pellets, extruded shapes, granules and fragments of different shapes when formed of molecular sieve grains and a binder, which, when combined with the grains, provides good adsorbent characteristics and high mechanical strength.

It is an object of this invention to produce and to provide a method for producing such high strength, adsorbent agglomerates of molecular sieve grains and it is a related object to provide new and improved applications for such agglomerates.

It will be understood that the selection of the crystalline nature of grains of the molecular sieves, the distribution in the size of the grains and the amount of binder employed will depend somewhat upon the particular properties desired of the molecular sieve, as governed by the application and use.

Thus it becomes possible to make use of a mixture of grains of larger size and grains of smaller size whereby the mixture will produce a sieve which is more compact and will contain the greatest amount of molecular sieves per volume and in which a correspondingly lesser amount of binder will be required.

Thus it becomes possible to make use of grains of a size larger than those usually employed in molecular sieves and in which use is made of an agglomerating agent in the form of active alumina obtained by partial dehydration of aluminum trihydrate in a hot gaseous current and which is characterized by a high adsorbent power and can be crushed to grain sizes below 10 to 20 $\mu$. The alumina can be hardened by the addition of small amounts of water or moisture, in accordance with a phenomenon similar to that described in U.S. Pat. No. 2,881,051 and U.S. Pat. No. 2,915,365. U.S. Pat. No. 2,915,365 teaches that the partial dehydration can be effected very quickly, with contact times between the alumina and the hot gaseous current ranging from a fraction of a second to several seconds.

The following examples, which are given by way of illustration, but not by way of limitation, of the practice of this invention make use of grains of 4 A molecular sieves prepared in accordance with the teachings of the aforementioned French application Ser. No. 14,834, and agglomerated with active alumina, in accordance with the practice of this invention. The products of this invention are compared to commercially available 4 A molecular sieves agglomerated with clay, as representative of the prior industrial practice.

EXAMPLE 1

840 G of 4 A molecular sieves of grains within the range of 30 to 100 $\mu$ are mixed with 300 g of active alumina obtained by partial dehydration of aluminum trihydrate in a current of hot combustion gases at a temperature of about 400° to 1000° C for a time ranging from 1 to 10 seconds, and crushed to a grain size below 10 $\mu$. The mixture is formed into pellets of 3 mm and hardened by exposure to moisture for 24 hours at 80° to 100°C and then dried. The dried pellets are activated by calcination at a temperature of 450°C.

EXAMPLE 2

The procedure is the same as that of Example 1, only the amount of 4 A molecular sieves is 600 g and the amount of active alumina, used as the agglomerating agent, is 500 g.

EXAMPLES 3 and 4

Commercially available agglomerates of 4 A molecular sieves and the same proportion of molecular sieves to agglomerating agent was employed as in Examples 1 and 2 but, instead of activated alumina, use was made of clay as the agglomerating agent.

The following table gives the results obtained by way of the measurements taken of the amount of water taken up by the granules at a temperature of 20°C in an atmosphere having different amounts of moisture. The foregoing evaluation gives an indication of the amount of adsorptivity. The crushing strength of the pellets was calculated by the mean impact strength of 20 pellets selected at random. The density of the grains and the total microporous volume were also calculated.

| Calcinated products 450°C | Water take-up in atmosphere containing of moisture | | | | Grain density | Crushing strength (kg) | Total microporous volume cm³/100 G |
|---|---|---|---|---|---|---|---|
| | 10% | 25% | 60% | 90% | | | |
| Example 1 | 16.8 | 18.6 | 22.5 | 26.4 | 1.17 | 1.9 | 30 |
| Example 2 | 14.2 | 16.9 | 23 | 29.1 | 1.23 | 6 | 35 |
| Example 3 | 18.5 | 20 | 22 | 23 | 1.4 | 2.5 | 24 |
| Example 4 | 13.7 | | 16.1 | 21.1 | 1.08 | 2.5 | 22 |

From the results, as tabulated above, it will be seen that the agglomerates formed with about 25% by weight alumina (Example 1) for sufficient solidity and that the amount of moisture taken up is higher by comparison with agglomerates formed with the same amount of clay at the higher humidity but slightly lower at the lower humidity. The agglomerates formed with the higher percentage of alumina (Example 2) give a desirable amount of adsorptivity at low humidities with considerably higher values at the higher humidities and an impact strength which is higher than the agglomerates of Example 1 containing the lesser amount of alumina. The values secured for the agglomerates of Examples 1 and 2 are all superior to the results secured with the agglomerate of Example 4, containing the larger amount of clay binder, except for the impact strength which is only slightly greater than the agglomerate of Example 1 but less than the agglomerate of Example 2.

The agglomerates of this invention are not limited to the 4 A molecular sieve of the foregoing examples. Other species of molecular sieves having grain sizes higher than 1 micron can also be used to produce agglomerates having excellent properties, when prepared in accordance with the practice of this invention.

Instead of forming the pellets or agglomerates by pressure molding, the pellets or agglomerates can be formed in a granulating bowl or by extrusion.

In the foregoing examples, use is made of alumina as an agglomerating agent because it produces agglomerates having new and novel properties and characteristics, particularly in the use of the agglomerates for drying. It has been found that the agglomerates of this invention are particularly stable in such drying applications, even after repeated regenerations.

Various agglomerates of molecular sieve grains with clay and activated alumina were prepared in accordance with the method of this invention. The agglomerates were then subjected to numerous tests, including a test to determine the crushing strengths, tests to determine adsorptivity and tests to determine the aging characteristics of the agglomerates. The tests for adsorptivity were carried out using air at one atmosphere pressure and relative humidities of 10% and 60%. The resulting adsorptivities are hereinafter referred to as $E_{10\%}$ and $E_{60\%}$, respectively, and are expressed as quantities of water in percent by weight based on the weight of the adsorbent which the adsorbent takes on in an atmosphere of air at the respective relative humidities of 10% and 60%.

Two aging tests were employed, as described below:

CYCLICAL AGING

Air saturated with water vapor at 20°C was dried by the agglomerate took up 20% by weight water. The agglomerate was then regenerated by the same humid air, but heated to a temperature of 250°C.

Each cycle of adsorption and regeneration lasted 3 hours, with 105 minutes for adsorption, 40 minutes for regeneration and 35 minutes for cooling.

CYCLICAL HYDROTHERMAL AGING

This aging test is more rigorous and was carried out by drying air saturated with water vapor at 20°C and 1 atmosphere with the agglomerate to be tested until the agglomerate took up 20% by weight water.

The water-laden agglomerate was regenerated in two cycles with (a) air saturated with water vapor at 95° to 100°C which was heated to 150°C, and (b) air saturated with water vapor at 20°C which was heated to 250°C. Each cycle of adsorption and regeneration lasted 4 hours, with 65 minutes for adsorption, 130 minutes for regeneration and 45 minutes for cooling.

The results of these tests are shown in the following table; for the sake of completeness, the data also includes the characteristics of molecular sieve grains agglomerated without the aid of a binder. However, the molecular sieve grains agglomerated without a binder have poor crushing strength which would prevent the use of such agglomerate in commercial drying applications. The crushing strength is the average for 10 grains test, with each grain having diameters of 2 to 4 mm.

TABLE I

| Products | Crushing Strength kilogram | New Condition | | ADSORPTION OF WATER AT 20°C IN % BY WEIGHT | | | | | | | | | | | | |
|---|---|---|---|---|---|---|---|---|---|---|---|---|---|---|---|---|
| | | | | After Cyclical Aging | | | | | | After Hydrothermic Aging | | | | | | |
| | | | | 20 cycles | | 60 cycles | | Relative Variation | | 10 cycles | | 20 cycles | | Relative Variation | | |
| | | $E_{10\%}$ | $E_{60\%}$ | $E_{10\%}$ | $E_{60\%}$ | $E_{10\%}$ | $E_{60\%}$ | $E_{10\%}$ | $E_{60\%}$ | $E_{10\%}$ | $E_{60\%}$ | $E_{10\%}$ | $E_{60\%}$ | $E_{10\%}$ | $E_{60\%}$ |
| 1. 4 A sieve grains having sizes of about 1 micron agglomerated without any binder | 1 | 19.6 | 24.4 | | | 19.5 | 24 | 0 | 2 | | | 19.1 | 22.8 | 3 | 7 |
| 2. 4 A sieve grains having sizes of about 1 micron agglomerated with clay binder (30% clay – 70% sieve) | 2.5 | 22 | 23 | 19.9 | 21.8 | 19.6 | 21.6 | 10 | 6 | 14 | 17 | 12.3 | 15.3 | 44 | 34 |
| 3. 4 A sieve grains having sizes of about 1 micron agglomerated with alumina (50% alumina – 50% sieve) | 2 | 15.7 | 22.8 | 14.9 | 22 | 14.6 | 21.3 | 7 | 7 | | | | | | |
| 4. 4 A sieve grains having sizes of about 1 micron agglomerated with alumina (30% alumina-70% sieve) | 1.5 | 16.8 | 22.5 | | | | | | | 18.6 | 14.9 | 18.5 | | 12 | 18 |
| 5. 3 A sieve grains having grain sizes greater than 1 micron and primarily within the range of 20 to 100 microns agglomerated without any | 1 | 20.4 | 23 | | | 19.9 | 22.4 | 3 | 3 | 16.8 | 19.3 | 22.4 | | 6 | 3 |

TABLE I-continued

| Products | Crushing Strength kilogram | New Condition | | After Cyclical Aging | | | | Relative Variation | | After Hydrothermic Aging | | | | Relative Variation | |
|---|---|---|---|---|---|---|---|---|---|---|---|---|---|---|---|
| | | | | 20 cycles | | 60 cycles | | | | 10 cycles | | 20 cycles | | | |
| | | $E_{10\%}$ | $E_{60\%}$ | $E_{10\%}$ | $E_{60\%}$ | $E_{10\%}$ | $E_{60\%}$ | $E_{10\%}$ | $E_{60\%}$ | $E_{10\%}$ | $E_{60\%}$ | $E_{10\%}$ | $E_{60\%}$ | $E_{10\%}$ | $E_{60\%}$ |
| 6. 3 A sieve grains having sizes of 2.5 about 1 micron agglomerated with clay binder | 16.8 | 20 | | 12.4 | 18 | 26 | 10 | 13 | 15.1 | 11.6 | 13.9 | 31 | 31 | | |
| 7. 3 A sieve grains having grain sizes greater than 1 micron and primarily within the range of 20 to 100 microns agglomerated with alumina according to the invention (50% alumina - 50% sieve) | 5 | 12.6 | 19.5 | 19.1 | | 12.4 | 18.8 | 2 | 4 | 12.4 | 19.2 | 12.2 | 18.9 | 3 | 3 |
| 8. 3 A sieve grains having grain sizes greater than 1 micron and primarily within the range of 20 to 100 microns agglomerated with alumina according to the invention (30% alumina – 70% sieve) | 4 | 16.3 | 22 | 21.8 | | 16.2 | 21.5 | 1 | 2 | 16.1 | 21.9 | 16 | 21.8 | 2 | 1 |
| 9. Activated alumina granules | 10 | 8 | 24 | 6.8 | 19.4 | 6.1 | 16.4 | 24 | 32 | 5.1 | 14.9 | 4.7 | 14.5 | 41 | 35 |

The sieve grains agglomerated without a binder (products 1 and 5 in the above Table) are tested for purposes of comparison only. Because of their low crushing strengths (of the order of 1 kg), these agglomerates cannot be used in industrial operations. The coarse grain sieves, 3 A, employed in the tests were prepared by exchanging the cations of 4 A sieves with potassium according to French Pat. No. 1,449,662. The test results show that the aging characteristics of the 3 A and 4 A sieves agglomerated without a binder are superior to those agglomerated with a clay in accordance with commercial practice; compare the aging characteristics of products 1 and 5 with products 2 and 6.

The results also demonstrate that the sieves agglomerated with clay are quite inferior from the standpoint of aging characteristics to the sieves agglomerated with activated alumina in accordance with the practice of this invention. For example, products 3 and 4 are superior to product 2 with respect to resistance to aging; similarly, products 7 and 8 are superior to product 6. This phenomenon is unexpected.

The test data demonstrates that the coarse grain sieves (20–100 $\mu$) agglomerated with activated alumina have greater crushing strengths as compared to fine grains agglomerated with activated alumina, which in turn have slightly lower crushing strengths as compared to sieves agglomerated with clay. This effect, however, is due solely to the geometry of the grains and is unrelated to the pore dimensions of the sieve grains.

Tests were also carried out to compare the adsorbent properties of the products described in Table I in a fresh condition and after passage of butadiene at a pressure of 1 bar and a temperature of 250°C for 2 hours. The treatment of various products with butadiene was for the purpose of depositing carbon in the adsorbent to reduce its capacity for absorption of water; these tests reproduce pollution conditions analogous to those incurred in industrial drying of gases.

The results of these tests are shown in the following table.

TABLE II

| | Product 6 | | Product 7 | | Product 8 | | Product 9 | |
|---|---|---|---|---|---|---|---|---|
| | 1(*) | 2(*) | 1 | 2 | 1 | 2 | 1 | 2 |
| Pickup of water | | | | | | | | |
| $E_{10\%}$ | 16.8 | 16.3 | 12.6 | 11.5 | 16.3 | 15.6 | 8 | 5.2 |
| $E_{60\%}$ | 20 | 19.5 | 19.5 | 17.4 | 22 | 20.8 | 24 | 16.3 |
| Percentage of deposited carbon in 100% anhydrous adsorbent | | 0.8 | | 2.4 | | 1.6 | | 5.2 |

(*)Column 1: prior to passage of butadiene
Column 2: after passage of butadiene

These tests demonstrate that, while the pollution with butadiene is greater in the case of adsorbents containing alumina as a binder, the adsorbents of the invention nevertheless have a high level of adsorptivity.

It will be understood that various changes and modifications can be made in the details of procedure, formulation and use without departing from the spirit of the invention, especially as set forth in the following claims.

I claim:

1. An adsorbent agglomerate consisting essentially of molecular sieve grains and an inorganic binder of alumina prepared by partially dehydrating an alumina hydrate in a current of hot gas at a temperature within the range of 400 to 1000°C for a time ranging from a fraction of a second up to 10 seconds, with the partially dehydrated alumina being aged in the presence of water and in the presence of the molecular sieve grains and with the resulting aged alumina being activated while in contact with the molecular sieve grains by calcination to form the agglomerates.

2. A method for the preparation of adsorbent agglomerates consisting essentially of molecular sive grains and an inorganic binder of activated alumina in admixture with the grains, comprising the steps of mixing the molecular sieve grains with a partially dehydrated alumina prepared by contacting an alumina hydrate in a current of hot gas at a temperature within the range of 400° to 1000°C for a time ranging from a fraction of a second up to 10 seconds, agglomerating the mixture, exposing the agglomerate to moisture to age and harden the alumina, drying the agglomerate, calcining the agglomerate to activate the alumina, and recovering the agglomerates.

* * * * *

UNITED STATES PATENT OFFICE
CERTIFICATE OF CORRECTION

PATENT NO. : 3,917,544
DATED : November 4, 1975
INVENTOR(S) : Max Michel

It is certified that error appears in the above-identified patent and that said Letters Patent are hereby corrected as shown below:

Column 4, line 20, please insert after "agglomerate", -- to be tested at a pressure of 1 atmosphere until the agglomerate --.

In Table I, line 5., under the column designated "10 cycles", please delete "16.8".
$E_{60\%}$ Signed and Sealed this thirtieth Day of March 1976

[SEAL]

Attest:

RUTH C. MASON
Attesting Officer

C. MARSHALL DANN
Commissioner of Patents and Trademarks